United States Patent [19]
Reuss et al.

[11] Patent Number: 5,579,318
[45] Date of Patent: Nov. 26, 1996

[54] PROCESSES AND APPARATUS FOR MAINTAINING DATA CONCURRENCE BETWEEN DATABASES IN TELECOMMUNICATIONS NETWORKS

[75] Inventors: Carolyn K. Reuss, Atlanta; Jerry C. Shih, Roswell; Paul T. Watson, Alpharetta, all of Ga.

[73] Assignee: BellSouth Corporation, Atlanta, Ga.

[21] Appl. No.: 269,917

[22] Filed: Jun. 30, 1994

[51] Int. Cl.$^6$ .................................................. H04J 3/24
[52] U.S. Cl. ..................... 370/94.2; 375/356; 370/103; 395/60
[58] Field of Search .................. 370/94.2, 93, 103; 455/7, 13.1, 33.1, 33.2, 33.4; 375/356; 395/60

[56] References Cited

U.S. PATENT DOCUMENTS

| | | | |
|---|---|---|---|
| Re. 34,529 | 2/1994 | Bicknell et al. | 379/220 |
| 4,445,213 | 4/1984 | Baugh et al. | 370/94.2 |
| 4,466,060 | 8/1984 | Riddle | 364/200 |
| 4,500,960 | 2/1985 | Babecki et al. | 364/200 |
| 4,614,841 | 9/1986 | Babecki et al. | 179/18 ES |
| 4,656,658 | 4/1987 | King | 379/221 |
| 4,685,125 | 8/1987 | Zave | 379/96 |
| 4,734,854 | 3/1988 | Afshar | 364/200 |
| 4,736,402 | 4/1988 | Landis | 379/16 |
| 4,747,127 | 5/1988 | Hansen et al. | 379/94 |
| 4,757,264 | 7/1988 | Lee et al. | 328/63 |
| 4,763,317 | 8/1988 | Lehman et al. | 370/58 |
| 4,805,209 | 2/1989 | Baker, Jr. et al. | 379/96 |
| 4,919,545 | 4/1990 | Yu | 380/25 |
| 4,926,495 | 5/1990 | Comroe et al. | 455/54 |
| 4,939,771 | 7/1990 | Brown et al. | 379/67 |
| 4,942,602 | 7/1990 | Baker, Jr. et al. | 379/212 |
| 4,972,461 | 11/1990 | Brown et al. | 379/67 |
| 4,984,234 | 1/1991 | Vergnaud et al. | 370/58.1 |
| 5,003,584 | 3/1991 | Benyacar et al. | 379/119 |
| 5,008,929 | 4/1991 | Olsen et al. | 379/112 |
| 5,008,930 | 4/1991 | Gawrys et al. | 379/210 |
| 5,056,086 | 10/1991 | Libonati | 370/62 |
| 5,130,982 | 7/1992 | Ash et al. | 370/85.7 |
| 5,153,907 | 10/1992 | Pugh et al. | 379/143 |

(List continued on next page.)

OTHER PUBLICATIONS

AT&T, A-I-Net™ Products, Custom Routing Service, Service Manual, Issue 1, May 1993, pp. 40–41.

*Primary Examiner*—Douglas W. Olms
*Assistant Examiner*—Shick Hom
*Attorney, Agent, or Firm*—James L. Ewing, IV, Esq.; Kilpatrick & Cody

[57] ABSTRACT

Data concurrence processes and systems for maintaining concurrence of parallel sets of data stored in telecommunication Network Elements. According to a preferred embodiment of such processes, an originating entity such as a Service Node sends a Request Message to a Network Element such as a Source Service Control Point in order to update data on that Source. The Source then sends a Request Message to the other Network Element, such as a Target Service Control Point, in order to update the parallel data contained in that Service Control Point. The Network Elements whose data are updated may send appropriate Result Messages in order to verify integrity of the data. Synchronization according to the preferred embodiment is preferably implemented by time stamping particular data in Request Messages at the first level, such as in the Service Node; the Request Messages and the updated data, together with Result Messages, then contain that time stamp which greatly simplifies reconciliation and verification efforts. The processes and apparatus also allow resynchronization of the data to occur at desired predetermined intervals, as well as data updating to occur during Area Transfer Operations in which particular subscriber data is being transferred from one mated pair of Network Elements to another. These data concurrence processes and systems are particularly useful for implementing new services such as Personal Number Calling services in an intelligent telecommunications network, because they allow updating of the parallel databases quickly, efficiently, and with a minimum of required coordination, management and opportunity for lost communications, stale data, and mishandled call processing.

51 Claims, 13 Drawing Sheets

U.S. PATENT DOCUMENTS

| | | | |
|---|---|---|---|
| 5,172,396 | 12/1992 | Rose, Jr. et al. | 375/356 |
| 5,175,765 | 12/1992 | Perlman | 370/93 |
| 5,182,744 | 1/1993 | Askew et al. | 370/16 |
| 5,187,710 | 2/1993 | Chau et al. | 370/110.1 |
| 5,193,110 | 3/1993 | Jones et al. | 379/94 |
| 5,206,901 | 4/1993 | Harlow et al. | 379/211 |
| 5,212,727 | 5/1993 | Ramkumar | 379/221 |
| 5,251,255 | 10/1993 | Epley | 379/242 |
| 5,276,444 | 1/1994 | McNair | 340/825.33 |
| 5,278,823 | 1/1994 | Handel | 370/13 |
| 5,282,244 | 1/1994 | Fuller et al. | 379/230 |
| 5,305,308 | 4/1994 | English et al. | 370/94.2 |
| 5,345,446 | 9/1994 | Hiller et al. | 370/94.2 |
| 5,408,506 | 4/1995 | Mincher et al. | 370/103 |

5,579,318

PROCESSES AND APPARATUS FOR MAINTAINING DATA CONCURRENCE BETWEEN DATABASES IN TELECOMMUNICATIONS NETWORKS

This invention relates to processes and apparatus for maintaining data concurrence between or among databases found in intelligent telecommunications networks, such as those databases that contain information relating to services desired by telecommunications services subscribers.

BACKGROUND OF THE INVENTION

Intelligent telecommunications networks have engendered a number of new and interesting services for telecommunications subscribers. Call routing, calling card checks, call screening, and identifying callers are some of the services which may now be supported by intelligent networks. The intelligent networks also now permit real time creation and modification of customized features and services desired by particular subscribers. An example is Personal Number Calling, in which a person may request that she or he be reached at one location for particular times of the day and at another location for other times, all using the same telephone number, but subject to change immediately.

Intelligent networks are well suited to address these new additional demands flexibly, efficiently and reliably. Information relating to the status of services and features desired by subscribers may be maintained in intelligent Network Elements ("NEs") such as conventional Advanced Intelligent Network ("AIN") Service Control Points ("SCPs"), Service Nodes ("SNs"), other Intelligent Peripherals ("IPs"), or other intelligent network elements which are available for query by central offices, switches and similar elements of the telecommunications switching network. Such subscribers may be those who subscribe to telecommunications, cable or television programming, multimedia or other services which may be provided on any information infrastructure, regardless of nature or bandwidth.

According to certain BellSouth Telecommunications intelligent network architecture, for a conventional example, data corresponding to the status of services and features for particular subscribers in a Personal Number Calling context may be stored in certain applications contained in Service Control Points. Appropriate logic in a Service Node is invoked by a call from a particular subscriber who wishes to make a change to her or his subscriber changeable data. The Service Node logic verifies the data from the subscriber and routes an update message to the appropriate Service Control Point that contains the subscriber's data. The logic provides verification to the subscriber if the update is a success and then continues call processing. If the update fails, the logic may attempt to update a second time which, if unsuccessful, results in denying the change to the subscriber and terminating the call.

For a number of reasons, it is desirable to maintain concurrent, redundant data corresponding to the same subscriber but resident on different machines and even at different geographical sites. In BellSouth Telecommunications intelligent networks for instance, there are at least two databases which store data for a particular subscriber. Each database resides in a different Service Control Point, and the Service Control Points are sometimes located geographically remotely from each other. (Each of the Service Control Points also preferably contains a parallel set of data mirrored locally/internally in conventional fashion on tandem devices.) The redundancy offered by these mated Service Control Point helps cover the unavoidable system failures and maintenance periods, but it also allows load sharing among Service Control Points as well as the capacity to designate active or standby Service Control Points in an effort to distribute the load across the network.

The conspicuous and primary disadvantage of such redundant databases is that they will inevitably fail to contain the same data at some point for reasons which are limited only by the imagination. For instance, during subscriber changeable data updating efforts, a particular relevant Service Control Point may be out of service or communications links may be lost. Data concurrence must obviously be restored quickly in such case, and in any event before the Service Control Point resumes call processing.

Even if platform or communications failures are discounted or ignored, reconciliation between the databases must occur in real time and reliably, since calls may be processed by either Service Control Point at any time depending on management and control of the network. Subscriber services such as Personal Number Calling only exacerbate this requirement, since, for example, a subscriber who is entering a change may be walking out the door and expecting calls in her car in the next few minutes.

Other conventional techniques for updating parallel databases such as those found in remotely located Service Control Points include communicating the update information simultaneously to the databases. Such techniques typically address the data reconciliation or synchronization issue with "audit" software in every application that corresponds to each set of subscriber data. This audit software seeks to synchronize subscriber changeable data between the mated databases by, among other things, recording information relating to any data for which an update failure occurs by reason of failure to synchronize with other applications, link failures, out-of-service conditions, or otherwise. If the software is unable to synchronize the data, it sets a "data audit" timer and attempts to synchronize again when the timer expires.

Primary among the issues created by this "audit" approach is that execution of the audit degrades system performance by dissipating processor capacity and other resources which could otherwise be employed to process calls (since the update messages have the same priority, typically, of any call processing messages). Additionally, the appropriate software must be included in each application that shares synchronous data with a mate and it thus wastes memory.

As an example, if an application in a first Service Control Point is rendered out of service, its mate, a service application in a second Service Control Point, may receive new subscriber changeable data (such as Personal Identification Numbers or Call Rejection Lists). Conventionally, when the first service application is restored, the Service Control Point automatically sends a signal to the appropriate Signal Transfer Point ("STP") that the SubSystem Number ("SSN") associated with the restored application is "allowed." Allowance of the SSN causes the Signal Transfer Point immediately to begin routing pending queries to the newly restored application. This unfortunately can occur before the application data has been updated with subscriber changeable data corresponding to the period in which the application or SCP was out of service. Conventional resolution of this problem involves entering a maintenance message at the Signal Transfer Point level which inhibits the SSN of the application that is in the restore process. This solution unfortunately involves coordination of at least two maintenance organizations and can in any event allow service call queries inadvertently to reach the service application after it has been restored and the SSN allowed, but before the STP has taken the SSN out of service.

Additionally, when an SSN is currently inhibited via the Service Control Point maintenance terminal for audit purposes, its assigned application is also taken out of service unless the application is designated with multiple SSNs (which can present other problems). It may also unfortunately be the case that the service application SSN must be active in order to communicate with the intelligent network, so that the application cannot be updated when it is supposedly being brought current through the audit process. Therefore, inhibition of a service application's SSN through the Service Control Point maintenance terminal during conventional update audit can unnecessarily prevent the application from completing data synchronization.

An interim solution is to utilize a Service Control Point maintenance message that allows the service application SSN to be inhibited from the call processing perspective (such as vis avis the STP) but which does not render the application out of service for other purposes such as synchronization through the audit process before final SSN restoration via X.25 links. This approach allows necessary maintenance commands to be entered from the Service Control Point maintenance terminal, X.25 communication to synchronize new subscriber changeable data, and a narrower opportunity for queries inadvertently to reach the unsynchronized application before it is taken out of service for audit purposes. The application may subsequently be restored to active status at the STP level. This data concurrence process is cumbersome at best, however, and its efficacy will erode even further as the network supplied services and subscriber bases proliferate and become more multivalent.

Conventional approaches to data concurrence accordingly fail adequately to address multiple needs associated with updating and reconciling redundant databases in mated Network Elements and applications reliably, efficiently, quickly and with a minimum of management and coordination.

SUMMARY OF THE INVENTION

One Network Element in a pair that contains redundant databases updates and thus reconciles with its mate Network Element according to the present invention. For instance, according to a preferred embodiment of the present invention, and at a database level, when a service application has received subscriber changeable data, its Service Control Point identifies that data as changed and causes corresponding information to be transmitted to the relevant application in the mate Service Control Point together with (preferably but not necessarily) information about the sending application address, receiving application address, subscriber identification and data identification. The mate Service Control Point checks the received data for errors, updates its appropriate application database and preferably sends a return message to the first Service Control Point. If successful, the first Service Control Point sends additional data (or in the event of an error, retransmits the earlier data). If the returned data is erroneous for a predetermined number of attempts, an error report is generated and synchronization efforts are terminated and may be rescheduled for later. If there is an error response or no reply from the mate Service Control Point for a predetermined number of attempts, the Service Control Point assumes that its mate (or mate application) is out of service and then schedules a resynchronization process to occur a predetermined time later. If the resynchronization process runs a predetermined number of times without success, an error report is generated and the audit is terminated or rescheduled.

As discussed below, the processes and systems of the present invention preferably occur at platform level rather than at application level in order, among other things, to realize economies of scale, avoid multiple copies of code and the need to reconcile them, make development easier, and avoid degradation of call processing functionality by eliminating unnecessary competition for processor capacity when service applications need it the most.

Additionally, a control network element according to the present invention may include or add time related data (hereinafter sometimes referred to as a "time stamp") in or to a requested data change, so that this single stamp may be employed by other network elements involved in synchronization and other processes according to the present invention. This approach avoids the conventional need for network elements to be precisely time-synchronized, even when at remote locations, in order for proper data reconciliation to happen.

It is, furthermore, preferable that processes of the present invention occur across a non-overlay network, such as (but not limited to) SS7.

It is accordingly an object of the present invention to provide improved processes and systems for maintaining data concurrence in redundant information infrastructure databases, which processes and systems operate quickly, efficiently, reliably and may be implemented in existing platform based software modules and across existing communication links so as to impose minimal additional processing or communications loads.

It is an additional object of the present invention to eliminate confusion that otherwise occurs when one network element simultaneously attempts to update two others and is forced to reconcile situations when updates have failed on either or both network elements.

It is an additional object of the present invention to eliminate the necessity of ensuring that network elements are time-synchronized with each other in order for their databases properly to be maintained concurrent.

It is a further object of the present invention to provide data concurrence processes which increase reliability of call processing by, among other things, reducing opportunities for Service Control Points or applications to miss receipt of subscriber changeable data.

It is a further object of the present invention to provide resynchronization processes which cause data to be synchronized before the point in time at which they are subject to query by the network.

It is a further object of the present invention to provide improved processes and systems for synchronizing data, which may be automatically controlled and/or manually started or stopped.

It is a further object of the present invention to provide data concurrence processes which allow control of the level of effort one network element devotes to updating another, including number of update attempts and period of time in which such attempts occur.

Other objects, features, and advantages of the present invention will become apparent with respect to the remainder of this document.

DETAILED DESCRIPTION OF THE DRAWINGS

Context

Processes according to the present invention suggest a new nomenclature for data type: "Synchronous Data." Synchronous Data may be considered data such as, but not limited to, subscriber changeable data which is maintained concurrently in different applications or Service Control Points. If, for instance, a first Service Control Point or application ("Source") receives subscriber changeable data from a Service Node that is desired to be the same in both SCP's or applications, that data constitutes Synchronous Data with which the Source updates its mate application or Service Control Point ("Target").

Figure 1:
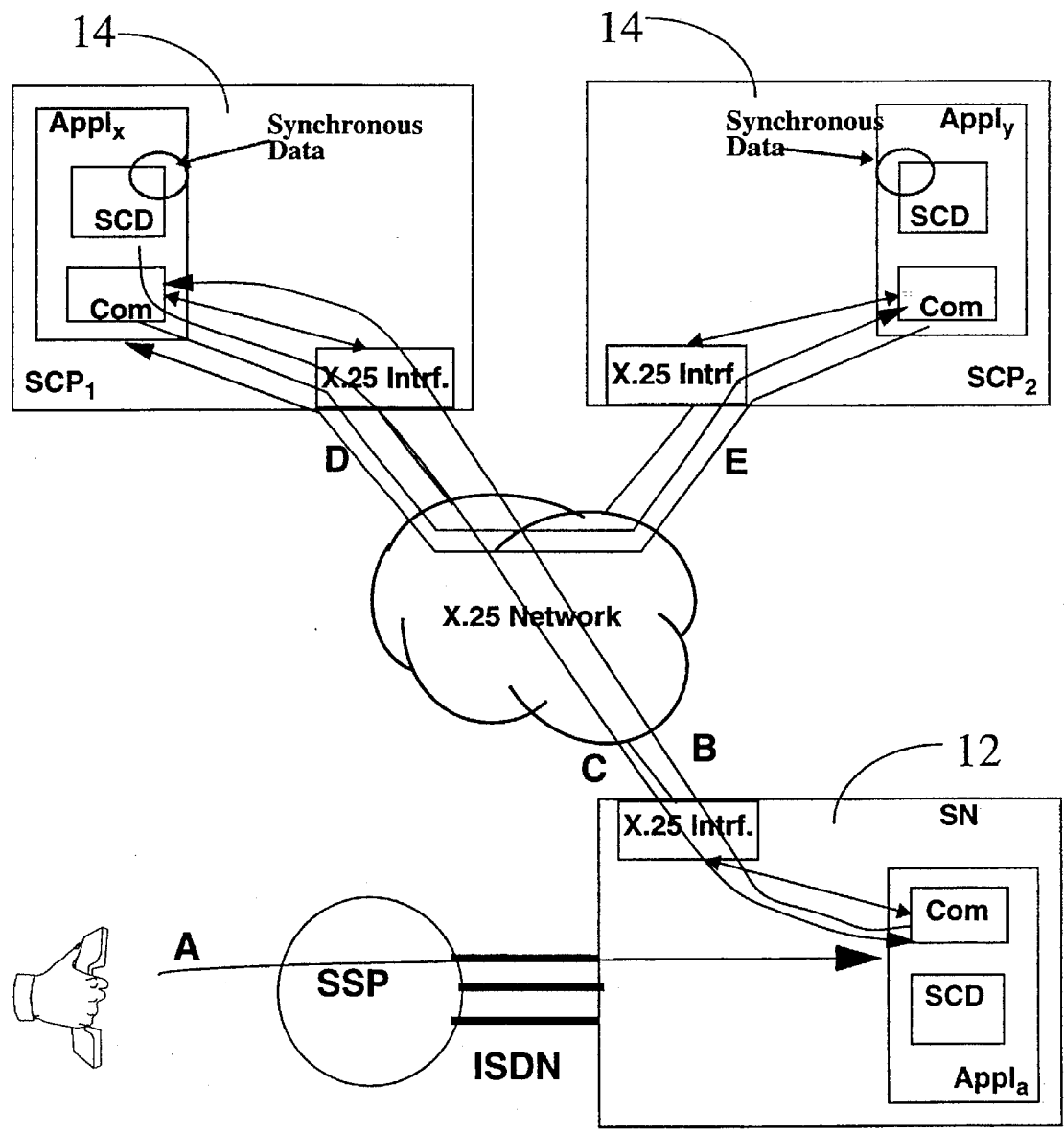
FIG. 1 is a contextual schematic showing conventional X.25 communication relationships among conventional telecommunications network elements.

A conventional X.25 communication network is shown in FIG. 1 for context purposes. It is, however, preferable for a non-overlay communication network, such as Signalling System Seven, to be employed for data synchronization according to the present invention. In that respect, FIGS. 5–9 show SS7 interfaces for such purposes. Use of SS7 for data transfer and synchronization according to the present invention is expected to increase in importance as AIN services are deployed in telecommunications networks. Other appropriate out of band communication networks may also be employed.

Although the Service Node is referred to as the originating entity in this disclosure, updating may originate from any suitable entity or component, including but not limited to Service Nodes, Service Control Points, Intelligent Peripherals, other Network Elements, switching devices, personal computers, Customer Premises Equipment of any sort, equipment of other network providers, cellular roaming platforms, home location registers, or cellular switches. Similarly, the updated entities may be Service Control Points, but they may just as easily be any entity in which information relating to information infrastructure subscribers is stored. For sake of convenience, however, the originating entities are referred to collectively in this document as "Service Nodes" or "Control Network Elements," while the entities whose data are being updated are referred to collectively as "Service Control Points," "Target Network Elements" or "Source Network Elements."

Overview

The synchronization processes and systems according to the present invention preferably occur at platform level rather than at application level, which creates several advantages. First among these is that the synchronization processes do not compete for processing capacity at the same level of priority as conventional applications do, and thus do not degrade service communication. This can be crucial at times such as during overload conditions. Second, service applications developers need not concern themselves with duplicating synchronization code every time they create a new service application (and updating multiple sets of code on a Network Element whenever a revision of synchronization code occurs); instead, a single set of code supports the applications on the relevant Network Element. Third, a particular service application need not be executing for synchronization of its data to occur.

The update logic is invoked by a call from a subscriber who desires changes to her or his services (and thus data, which may be, for purposes of this disclosure, subscriber changeable data). In the preferred embodiment, the Service Node logic collects the data from the subscriber, verifies it and passes control to the update part of logic which performs the following steps: (a) constructs a routing string for the particular subscriber which is employed in the destination Service Control Point for routing; (b) sends an update Request Message to either one of the Service Control Points (preferably with an origination time stamp which the Service Node has generated for use with all updating efforts on the Network Elements for that particular data); (c) if the update is a success, provides information to the subscriber and continues call processing; (d) if the update is a failure, attempts to send the update to the other (or another) Service Control Point; (e) if the second attempt is a success, provides information to the subscriber and continues call processing; and (f) if the second update fails, denies the service change to the subscriber and terminates the call. Other originating entities may just as easily employ similar and other steps for updating.

From the Service Control Point perspective, when one of its service applications receives an update Request Message, it performs a "synchronous data write" and then resumes processing the logic that performs the intended service.

At this point a common synchronization process, which occurs at platform level rather than at application level, takes over the responsibility for changing the data in all the mated databases. The synchronization logic is thus part of the Service Control Point platform level logic according to a preferred embodiment of the present invention. It essentially performs four functions there: (a) updates local subscriber changeable data; (b) synchronizes the mated Service Control Point; (c) resynchronizes the mated Service Control Point for out-of-sync subscriber records; and (d) assists in conducting Area Transfer Operations.

The first two functions occur in the preferred embodiment typically when a subscriber is updating her or his subscriber changeable data. The third function occurs only if either or both of the first two functions fail and subscriber records are therefore unsynchronized (and so long as the resynchronization process is not inhibited). The fourth function may be part of the normal update process, but is executed only when subscriber data is being relocated from one Service Control Point pair to another Service Control Point pair, such as in Area Transfer Operations.

The "Update Subscriber Changeable Data" portion of synchronization logic accepts Request Messages sent by a Service Node in order to update the subscriber's data. A Success Return Result message is sent back to the sending Network Element if the update succeeds, a Failure Return Message if the update fails. These synchronization messages received from a mated SCP may arrive on the same network interface as update messages or database queries. They go directly to the common, platform based synchronization process. The common synchronization process is responsible for updating the subscriber's data and returning the appropriate result message. The service application need not be invoked.

These synchronization messages may have different priorities than network queries so that Network Element resources can be optimized to meet network call processing demand. The common process also avoids the time, effort and expense, as mentioned above, of having to maintain a version of the process for each application.

The "Synchronize The Mated Service Control Point" portion of the synchronization logic is a continuation of the "Update Subscriber Changeable Data" logic design. After the subscriber profile is successfully updated locally, this portion builds a Synchronization Update Request Message to the mated Service Control Point (assuming that the change originated at a Service Node, or from an appropriate SCP during an Area Transfer Operation). This message contains the same update information as the Request Message from the Service Node. If this message cannot be delivered to the mated Service Control Point, the subscriber changeable data is marked out-of-sync and a Resync Process will be scheduled to resynchronize the mated Service Control Point at a later time.

The resynchronization event or "Resync Process" is a scheduled event that attempts to synchronize the mated Service Control Point with local subscriber records that are marked out-of-sync. The Resync Process occurs only if out-of-sync subscriber records exist as denoted by flags. An out-of-sync flag is set by the "Synchronize The Mated Service Control Point" logic when an update to its mate Service Control Point fails. The Resync Process is a separate process that a service application calls as needed. A craft person may interrupt the process. The interruption can be either via inhibit or stop during the process.

Area Transfer Operations occur when subscribers are moved from one Service Control Point pair to another. During this transition period, affected subscriber profiles will be maintained in both the old Service Control Point pair and the new Service Control Point pair. The updates (subscriber changeable data or otherwise) to subscriber data are transmitted both to the old and new Service Control Point pairs. The Area Transfer design allows synchronization across Service Control Point pairs to occur by craft input commands.

The messages are preferably routed via SS7 or other desirable out of band non-overlay network interfaces according to the present invention. The interfaces attempt to route a message using a routing string when available. When not, the interfaces then attempt to route the message using the SSN if provided. According to the preferred embodiment, the message is routed according to SSN only when there is a transmission or application error.

Message Formatting

Messages may be formatted as follows according to the preferred embodiment of the present invention. As alluded to above, a first format may be used for sending update request messages ("Request Message"), a second format for resynchronization between Service Control Points ("Resync Message"), and a third for sending return result messages ("Result Message"). Each message contains a header and a body. The header includes elements needed to route the message to the destination; it preferably has a generic fixed format. The body preferably contains relevant Synchronization Data and preferably has a free format structure in order to provide maximum flexibility for application developers to define message protocol used in a specific application.

Figure 2:
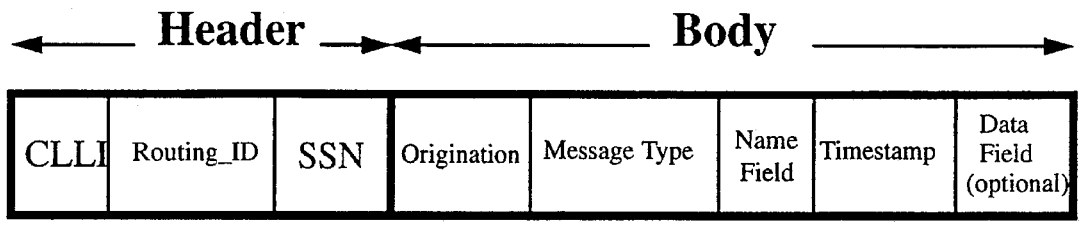
FIG. 2 shows the format of a Request Message according to a preferred embodiment of the present invention.

FIG. 2 shows the format for a Request Message according to a preferred embodiment of the present invention. CLLI denotes a standard Common Language Location Identifier, which is, in the preferred embodiment, eleven characters long and utilized to address the Target Service Control Point. It is data which is conventionally administered in a Service Control Point table. Just as easily, Global Title Value or other suitable network identifier may be employed; collectively, for the sake of convenience, all such identifiers are referred to in this document for messaging purposes as "CLLI."

The Routing_ID, or routing string, is preferably utilized by the receiving Network Element to route the message to the appropriate subscriber. It is constructed by the sending Network Element. The SSN provides an alternative routing at the destination Service Control Point. The routing algorithm at the receiving Network Element attempts first to route the receiving message using the Routing_ID. If the message cannot be routed via the Routing_ID then the SSN is used for routing.

The body portion of the message contains information needed to update the subscriber profile. The following version is specific only for a preferred embodiment of Personal Number Calling services provided according to the embodiment, and will change for various services and applications since it is freeform in nature. Any of these messages may contain more than one parameter pertaining to profile changes.

(1) The origination field indicates where the message originated. The Service Control Point employs this field to determine whether the message is an OriginalUpdate Message from an Service Node whose data also needs to be sent to a mated Service Control Point for update, or whether it is merely a Sync Update Message for local update only. The field may be either "SN" or "SCP" to denote these states.

(2) The "MSG Type" field indicates what type of message is being sent. This field may be any of the following:
 (a) OriginalUpdate which indicates that the update message is the original input from a Service Node;
 (b) A SyncUpdate which indicates that the message is a copy from a mate Service Control Point; or
 (c) A TransferUpdate which indicates that the message is from a subscriber's former Service Control Point and is sent during an Area Transfer Operation (with the implication that the receiving Service Control Point will send a synchronization update message to its mate Service Control Point).

(3) The Name Field indicates which data must be updated.

(4) The Time Stamp field may be and is preferably employed to determine currency of data and to ensure the latest value of data is used in a resynchronization process. The field corresponds to the origination time of the message, preferably as generated by the originating Network Element or platform (Service Node in the preferred embodiment). Processes and systems which do not employ this time stamp will rely on conventional timing and synchronization techniques among Network Elements in order to determine the currency of data. If, for instance, a timestamp is not feasible, data may be included which implies precedence or sequence, such as data based on incrementation.

(5) The Data Field indicates the new value of data specified in the Name Field. It is an optional field applicable to certain update operations. The Name Field defines whether this field is required and the length, if so.

(6) A sequence identifier field may be included to indicate sequence of data in a multi-message Resync Process.

Figure 3:
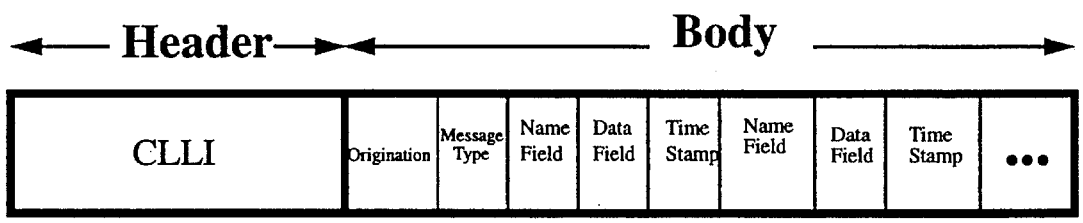
FIG. 3 shows the format of a Resync Update Message according to a preferred embodiment of the present invention.
Figure 4:
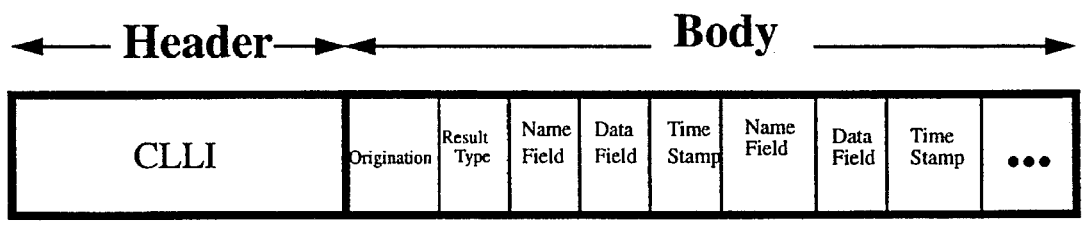
FIG. 4 shows the format of a Result Message according to a preferred embodiment of the present invention.

FIG. 3 shows a Resync Message Format and FIG. 4 shows a Result Message Format. The data fields are similar, with an Origination and Message Type field, followed by a recurrence of Name Field, Data Field, and Time Stamp field as required (and in the order desired).

The logic design according to the preferred embodiment of the present invention preferably is in accordance with query/response operation; a single transaction involves two messages, a Request Message and a Result Message. The Request Message initiates the transaction and thus requires a header which contains complete information as to routing. Once an update transaction begins, however, transaction identification data is maintained in the sending Network Element in order to track the transaction. The Result Message is thus recognized as a response to the Request Message in the same transaction. Accordingly, employment of the transaction identification data allows the sending Network Element to track and route a responding Result Message. This technique allows a shorter Result Message in which only the CLLI code is required in the header portion in order to allow the responding Network Element to choose the correct data link to return the message to the Source. Other types of messaging may be employed as desired.

A difference in the data or body portion of the Result Message from the Request Message and the ResyncUpdate Message is that the Result Message contains a Result Type field instead of a Message Type field. The Result Type field is employed to communicate the update result to the sending Network Element. The values of the Result Type field may be as follows:

(a) "success" which indicates that subscriber data has been updated successfully;

(b) "failureNotfound" which indicates that the subscriber data update failed because the subscriber record cannot be located;

(c) "failureUnknown" which indicates that the received message is not properly interpreted by the receiving Network Element; or (d) "NewerData" which indicates that the receiving Network Element has a more recent copy of subscriber data than that contained in the Request Message. The update information in the body portion of the Result Message is meaningful only if the Result Type field is set to NewerData and will have the same format as the ResyncUpdate Message.

Scenarios

Figure 5:
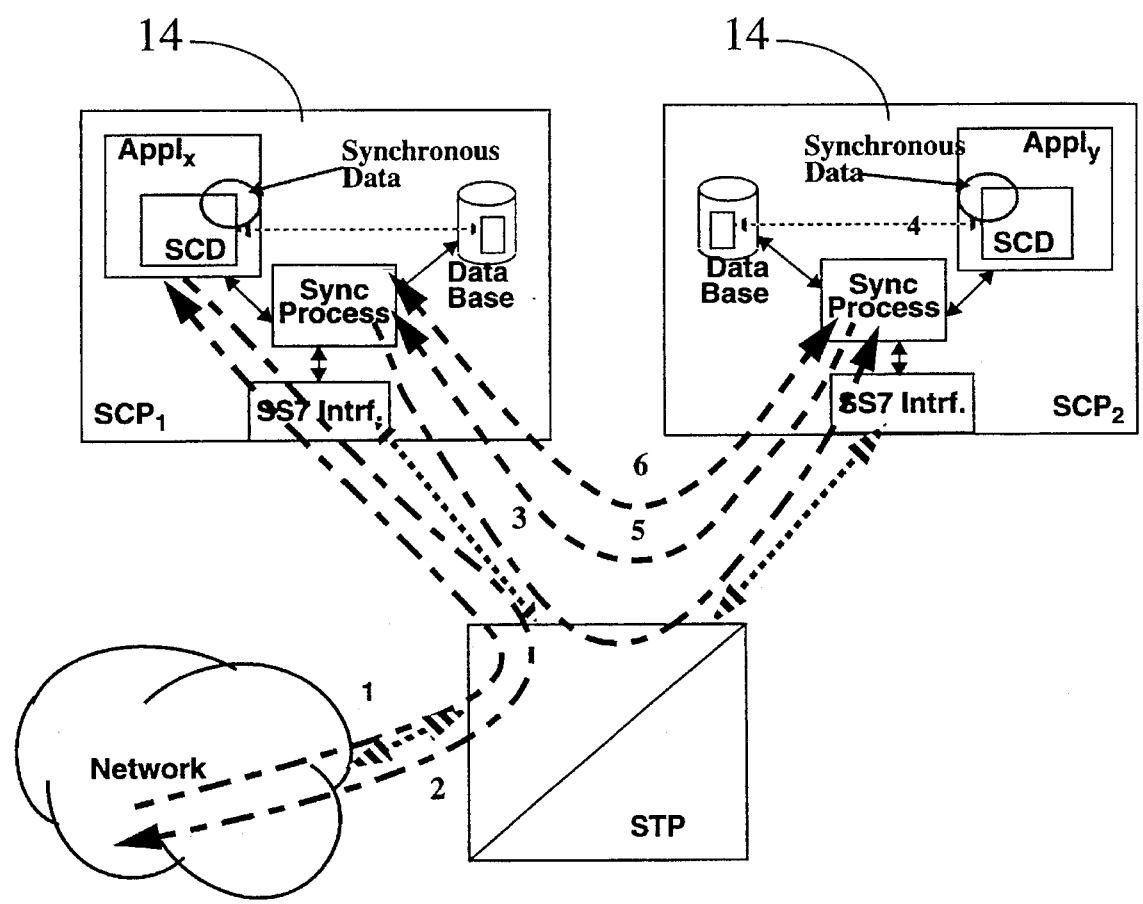
FIG. 5 shows a first update scenario according to a preferred embodiment of the present invention.

FIGS. 5–9 show certain scenarios which may occur in connection with systems and processes according to the present invention. FIG. 5 shows an update scenario in which the first update succeeds. Bold numerals represent the following steps. In step 1, the subscriber (indirectly) makes changes to Synchronous Data in SCP1. SCP1 may be either SCP in the pair, depending on where the change request arrives first. SCP1 makes data changes and responds to the subscriber as shown in step 2. SCP1 originates a message with new Synchronous Data to SCP2 in step 3. In step 4, SCP2 receives the Synchronous Data and makes the update. It returns a Success Result Message to SCP1 in step 5 and the process repeats if necessary until data is transferred.

Figure 6:
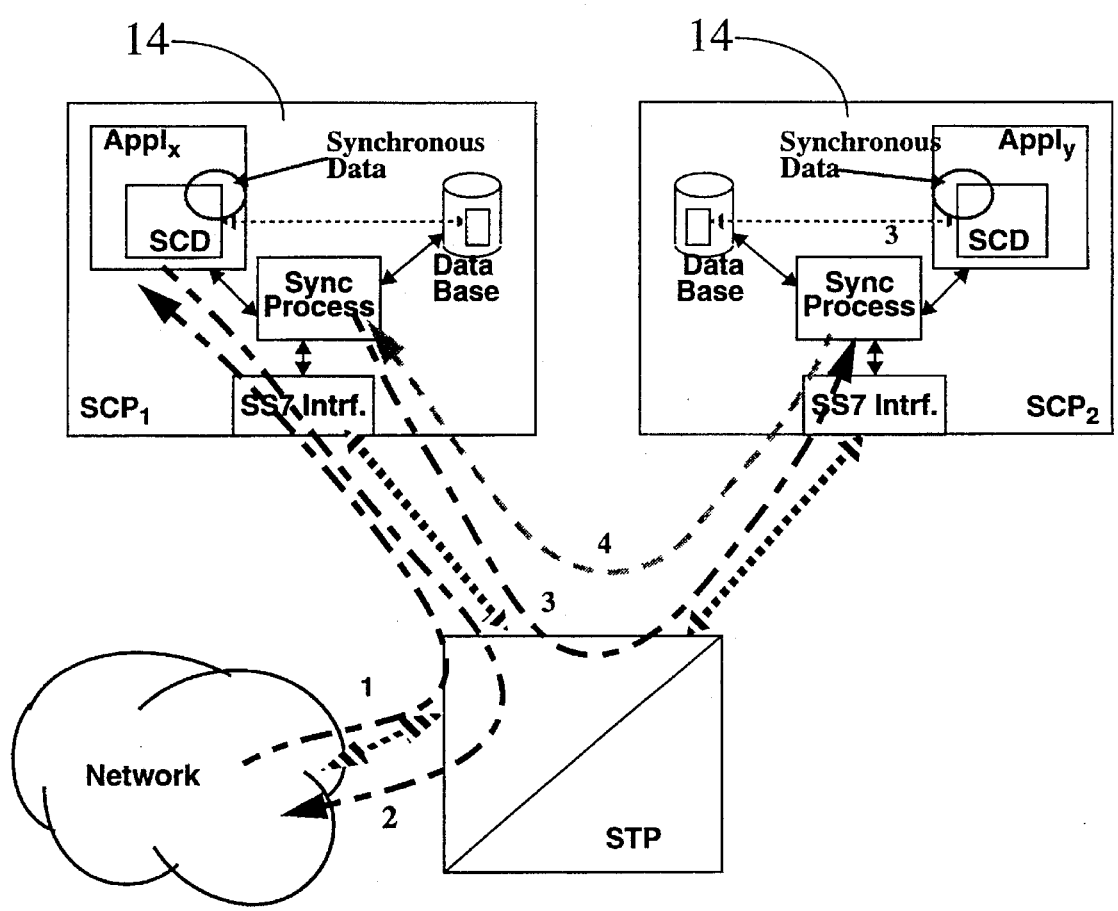
FIG. 6 shows a second update scenario according to a preferred embodiment of the present invention.

FIG. 6 shows a failure scenario. In step 1, the subscriber originates a change to Synchronous Data. SCP1 makes data changes and responds to the subscriber in step 2. In step 3, SCP1 originates a Request Message with new Synchronous Data to SCP2. SCP2 does not respond in step 4, and in step 5, SCP1 flags data as out-of-sync, schedules a Resync Process for later execution, and terminates the process.

Figure 7:
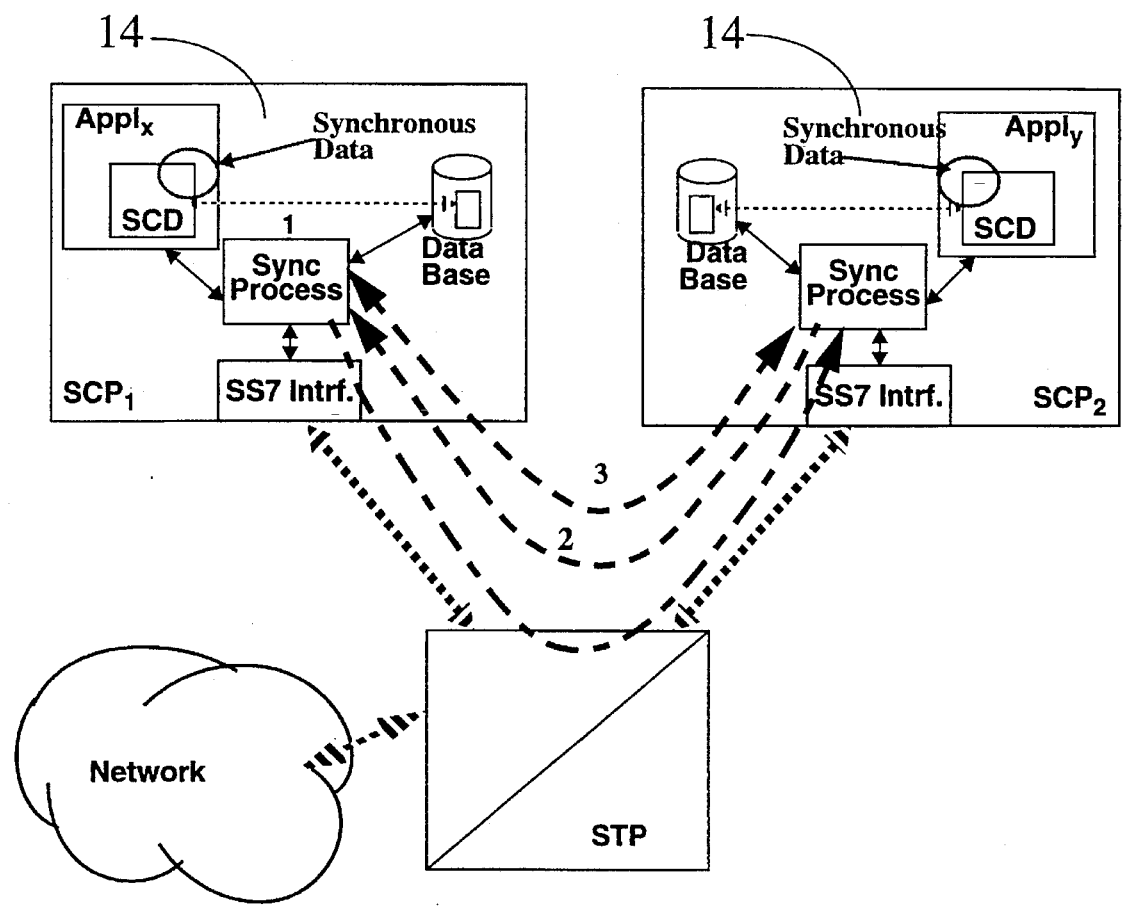
FIG. 7 shows a third update scenario according to a preferred embodiment of the present invention.

FIG. 7 shows a Resync Process, after SCP1 has received a failure when attempting to update SCP2, and has scheduled a Resync Process in order to resynchronize data. In step 1, a Resync Process is activated in SCP1. The synchronization logic reviews all subscriber Synchronous Data for any application, in order to identify out-of-sync data records. A message is built for every out-of-sync record in order to synchronize with the mate SCP, SCP2. In step 2, SCP2 receives the Request Message from SCP1, updates its subscriber profile if appropriate and returns a Success Result Message. If the data can be determined as newer than that in SCP2, then the newer data is returned to SCP1 in a Result Message in order for updating there. In step 3, SCP1 repeats step 1 until all subscriber profiles have been examined and updated. SCP2 repeats step 2.

Figure 8:
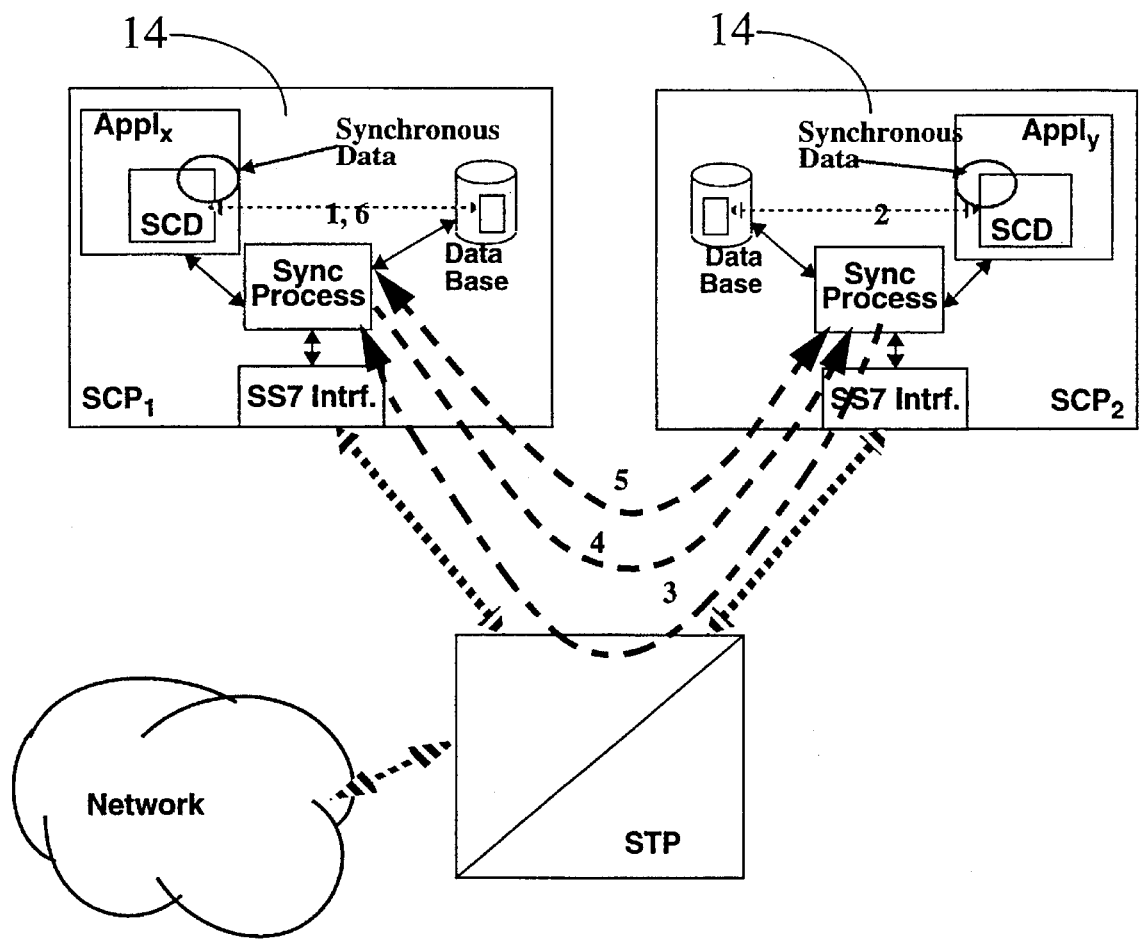
FIG. 8 shows a fourth update scenario according to a preferred embodiment of the present invention.

FIG. 8 describes another situation in which the subscriber's data is out-of-sync between mated SCPs, and how the Resync Process occurs. The process is initiated by restoration of the out-of-service SCP or application. Assume, for instance, that SCP1 received a failure when attempting to update SCP2 with Synchronous Data. SCP1 has then scheduled a Resync Process in order to perform data resynchronization. Before or after that Resync Process scheduled time, the out-of-service SCP or application is restored. During the restore process, the SCP or application being restored will not receive queries. In step 1, SCP1's Synchronous Data is out-of-sync with its mated data in SCP2. Either SCP2 or an application ($Appl_y$) is out of service. SCP1 has attempted to conduct a Resync Process and has scheduled another. In step 2, the out-of-service SCP2 or $Appl_y$ begins the restoral process. In step 3, SCP 2 generates a Request Message to SCP1 which causes SCP1 to begin any pending Resync Processes. In step 4, SCP2 receives a Resync Request Message, updates its subscriber profile if appropriate, and returns a Success Result Message. If the data is newer in SCP2, then the newer data is returned to SCP1 in a Result Message. In step 5, SCP1 repeats step 4 until all subscriber profiles have been examined and updated. Unsuccessful Resync Processes are rescheduled for subsequent times. Once restoral is complete, SCP2 can receive queries from the network.

Figure 9:
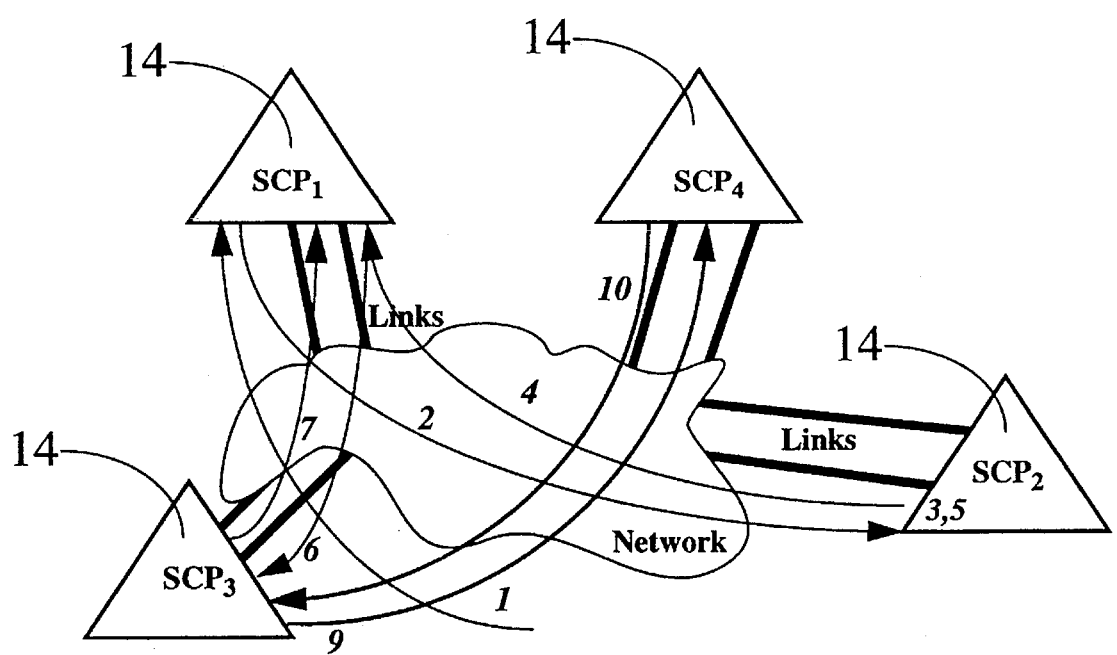
FIG. 9 shows a fifth update scenario according to a preferred embodiment of the present invention.

FIG. 9 shows a scenario for Area Transfer Operation according to the present invention. This occurs when subscriber profiles in one SCP pair are moved to another SCP pair. During the transition, the queries for those transferred subscribers may go either to the old SCP pair (SCP1 and SCP2) or the new SCP pair (SCP3 and SCP4). During this period, the subscriber's new Synchronous Data must be updated both in the old and new SCP pairs. This scenario shows only a simple successful case; the error cases will be handled in the same way as described in previous scenarios (FIGS. 6, 7, and 8). In step 1, a subscriber requests changes to Synchronous Data in which is communicated to SCP1. The subscriber confirms a change. In step 2, SCP 1 originates a Request Message with new Synchronous Data to SCP2. In step 3, SCP2 receives the new Synchronous Data and makes the update. SCP2 returns a Success Result Message to SCP1 in step 4 and the process repeats if necessary until data is transferred in step 5. In step 6, SCP1 originates a Request Message with new Synchronous Data to SCP3. SCP3 updates its subscriber profile and returns a Success Result Message to SCP1 in step 7. The process repeats until necessary data is transferred (step 8) and SCP3 originates a Request Message to SCP4 in step 9. SCP4 updates its subscriber profile and returns a Success Result Message in step 10. The process repeats until necessary data is transferred.

Logic Flow

Figure 10:
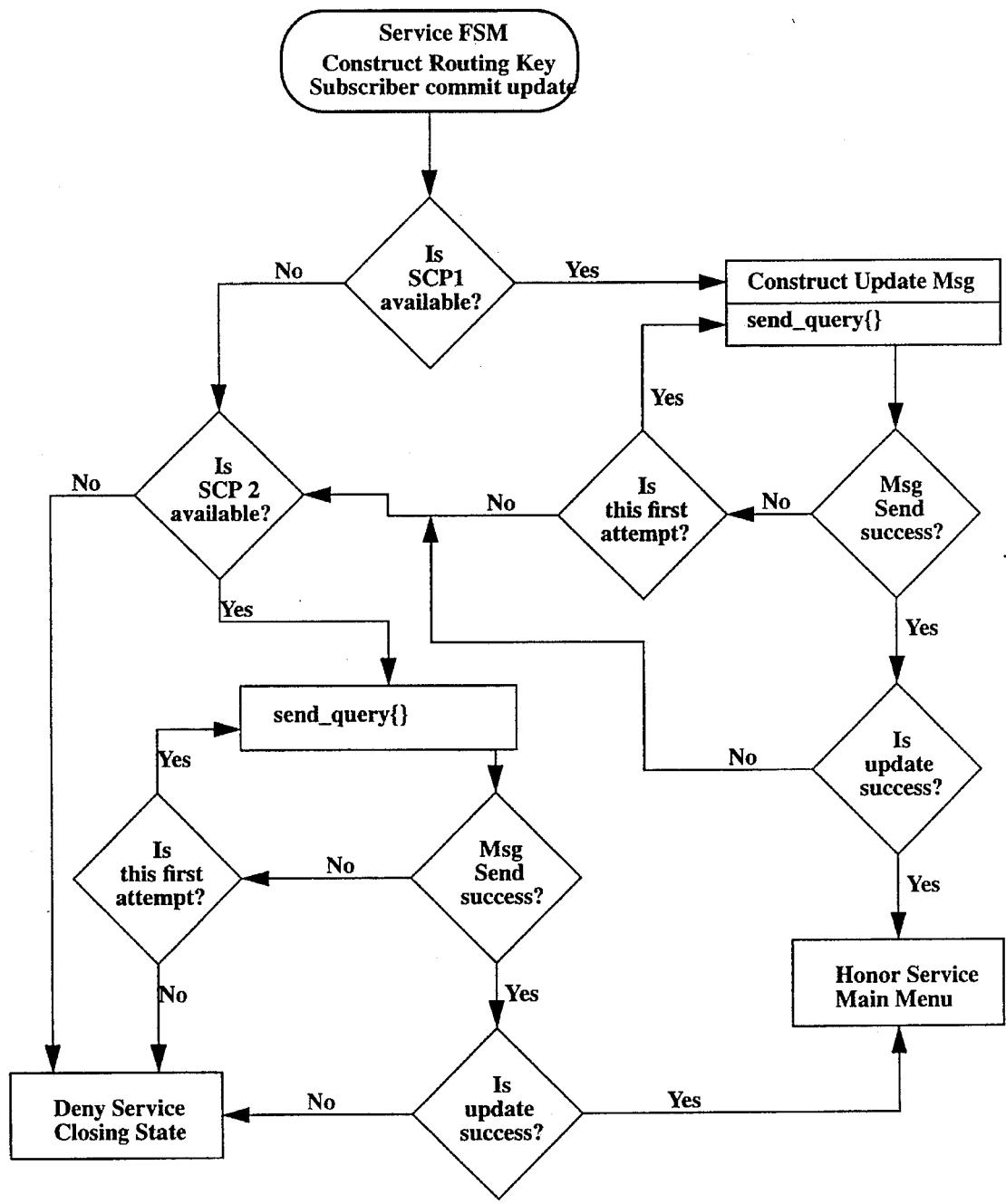
FIG. 10, FIG. 11, FIG. 12, FIG. 13, FIG. 14, and FIG. 15 together constitute a flow diagram of logic according to a preferred embodiment of the present invention.

FIGS. 10–15 collectively show logic flow according to a preferred embodiment of the present invention, and a brief discussion follows (although the figures are self explanatory). FIG. 10 is a flow chart for logic design to accomplish a Service Node Update. According to that design, the Service Node logic has received and confirmed a subscriber changeable data change from the subscriber in its appropriate state. The call control is handed to the communication logic. A routing key is constructed and the Update (or Request) Message is built. The Update Message is then sent to the destination Service Control Point. The logic first checks to see if SCP1 is available and if not, deals with SCP2 first. If the Update Message cannot be delivered to the destination SCP, then the delivery is reattempted. If the second attempt succeeds, the Update Message is sent to the SCP. If the Update Message succeeds, then the service is honored. If it fails, the other SCP is designated to repeat the process. If two attempts to send the Update Message to the other SCP fail, the service is denied and the call ended.

Figure 11:
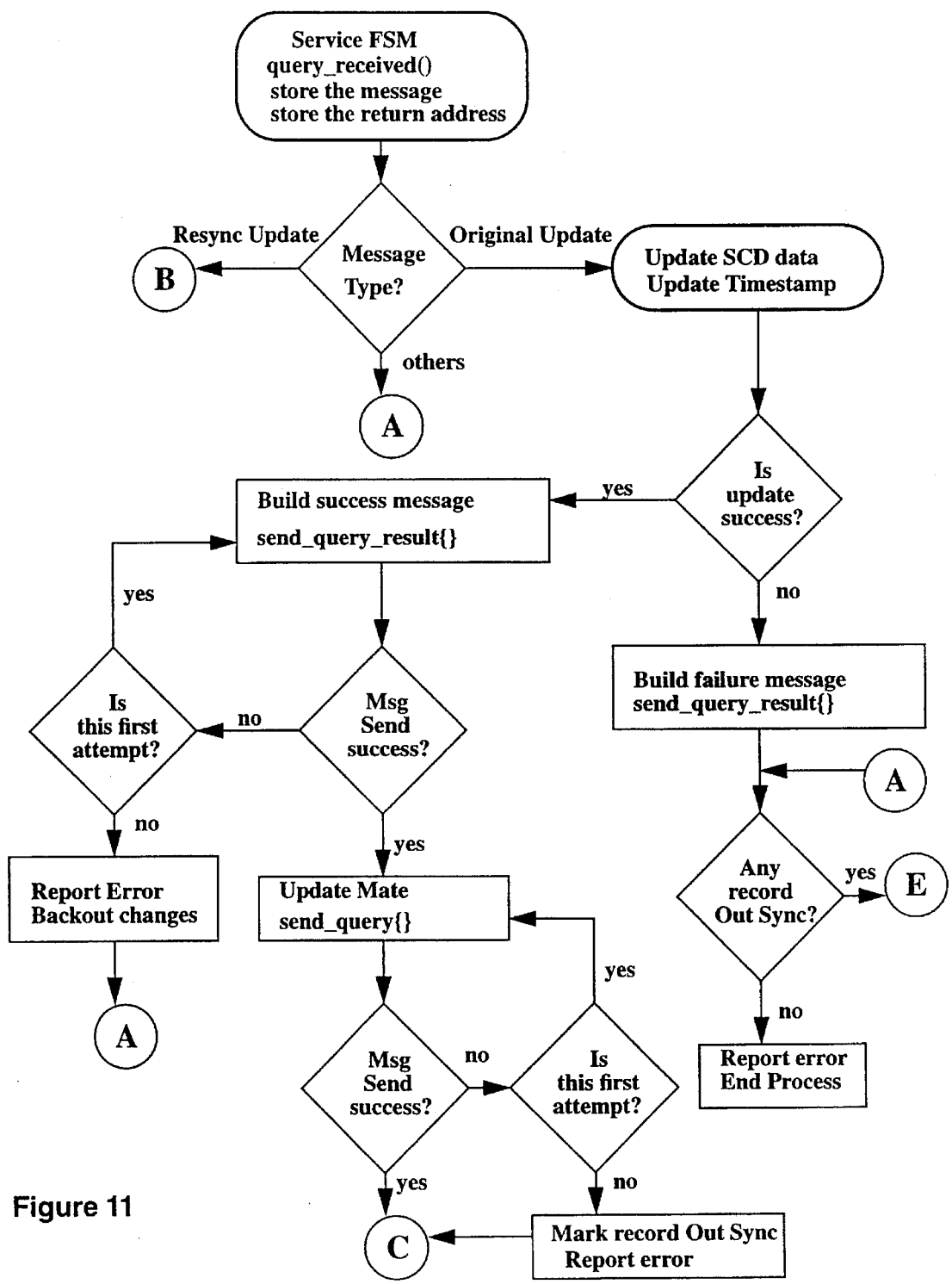
Figure 12:
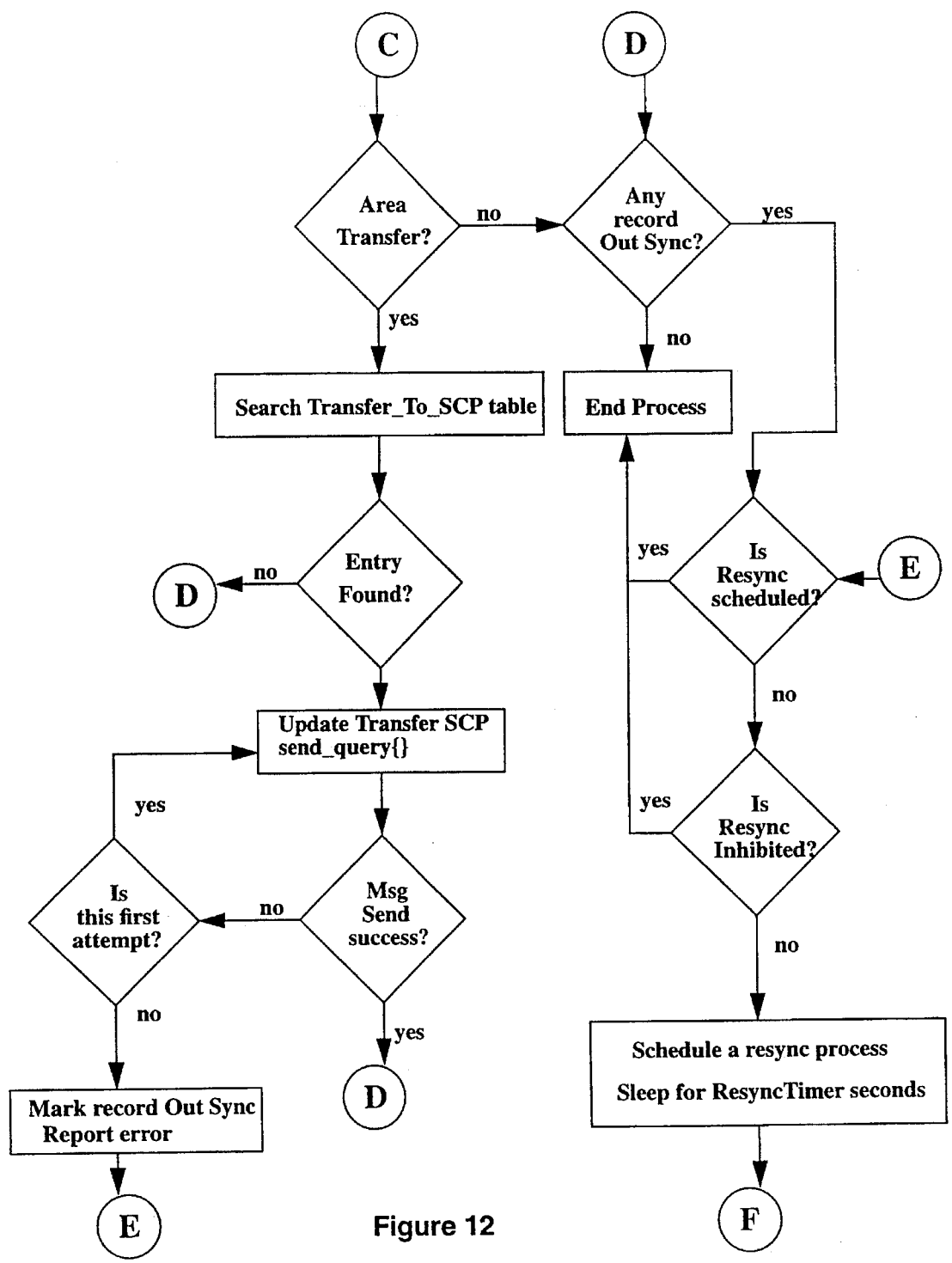

FIGS. 11 and 12 show logic design flow for updating data in a Network Element. The Update Message is received and saved later to synchronize the mated Service Control Point. The message is interpreted and local subscriber changeable data is updated. If the update is a success, a Success Result Message is built and sent to the Network Element that sent the Update Message. If, after the second attempt, the Success Result Message fails to reach that Network Element, a Resync Process can be scheduled as shown in the circled "E" tie to FIG. 12. If the Success Result Message is successfully sent, the Service Control Point attempts to update the mated Service Control Point. If the Update Message is not delivered successfully to the mated Service Control Point, then the attempt is repeated and the data marked out of sync if the second attempt is unsuccessful. If the attempt succeeds, then the Update Message is interpreted and local subscriber changeable data is updated on the mated SCP. If the update is a success, a Success Result Message is built and sent to the Source SCP. If, after the second attempt, the Success Result Message fails to reach the mated Service Control Point, a Resync Process is scheduled as shown in the circled "E" tie to FIG. 12. If an Area Transfer Operation is being conducted, as shown in FIG. 12, then the SCP CLLI code from the relevant table is obtained and a Transfer Update Message is built and sent to the relevant new Service Control Point. The transmission is reattempted if the first attempt is unsuccessful; after a second unsuccessful attempt, the data is marked out of sync. If any subscriber record is out of sync, then: (a) the process is ended if a ResyncInhibit Flag is set; (b) the process is ended if a Resync Process has already been scheduled; or (c) a Resync Process is scheduled and the ResyncSet Flag is set.

Figure 13:
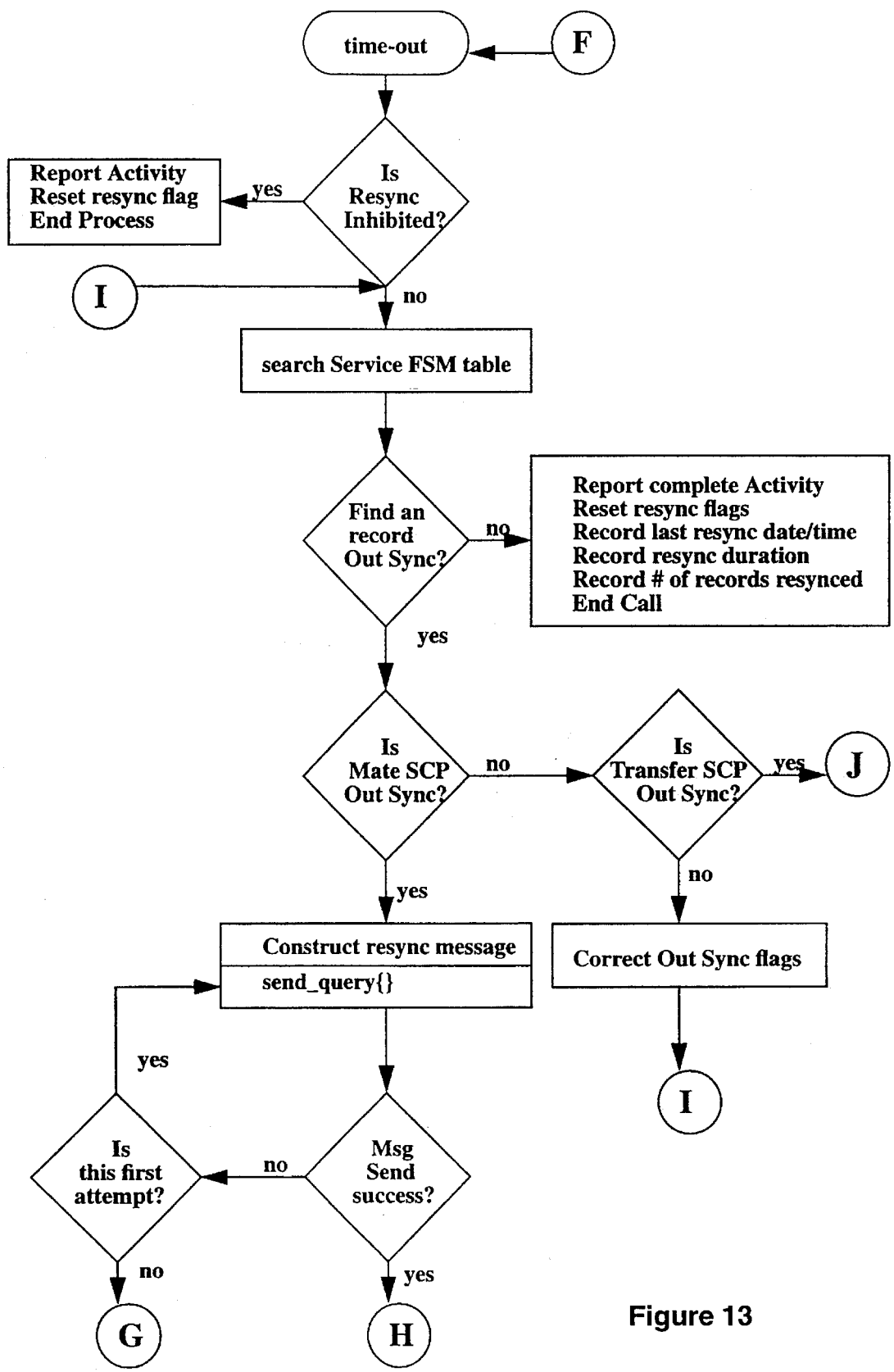
Figure 14:
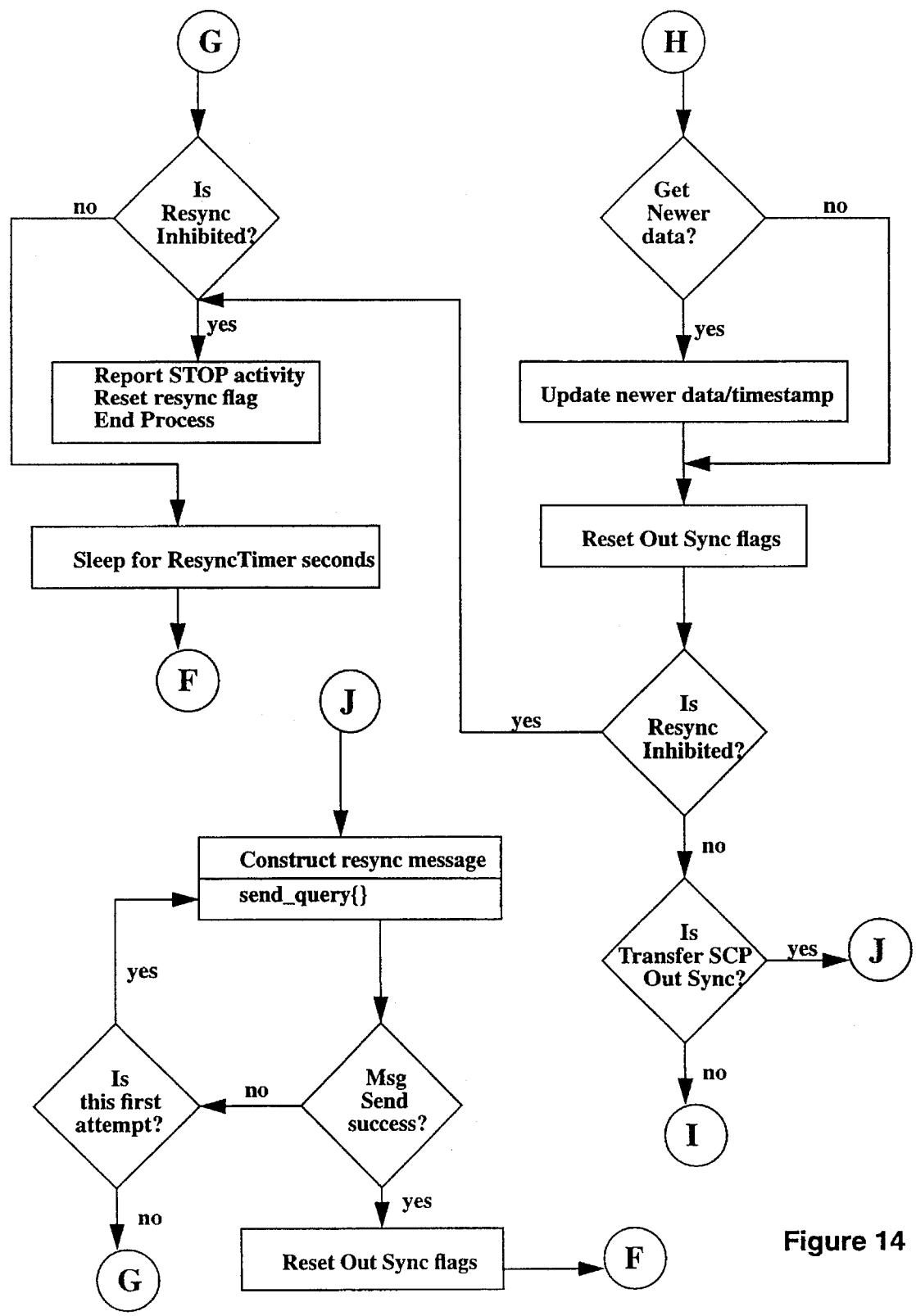

FIGS. 13 and 14 show a Resync Process flow according to logic design of the preferred embodiment. As shown in FIG. 13, a timer expires and the Resync Process begins. If the ResyncInhibit Flag is set, then the ResyncSet Flag is reset to "false" and the process is ended. If not, the entire subscriber database is reviewed for out-of-sync records. If none are found, then the process is ended after a number of reports and records as shown in the flow diagram have been built and sent. If an out-of-sync record is found, a Resync Message is built and sent to the mated Service Control Point. The message delivery is attempted twice; after a second unsuccessful attempt, the process is ended and the ResyncSet Flag is reset when the ResyncInhibit Flag is set to "true"; otherwise, the Resync Process is deactivated until the next Resync Process is scheduled to occur if the ResyncInhibit Flag is set to "false." If the Resync Message is successfully sent, and the return Result Message is set to NewerData, then local Service Control Point data is updated. If any mated Service Control Point records are out-of-sync, then a Resync Message is rebuilt and resent. If all of the out-of-sync records have been successfully synchronized, then the ResyncSet Flag is reset and the process ended.

Figure 15:
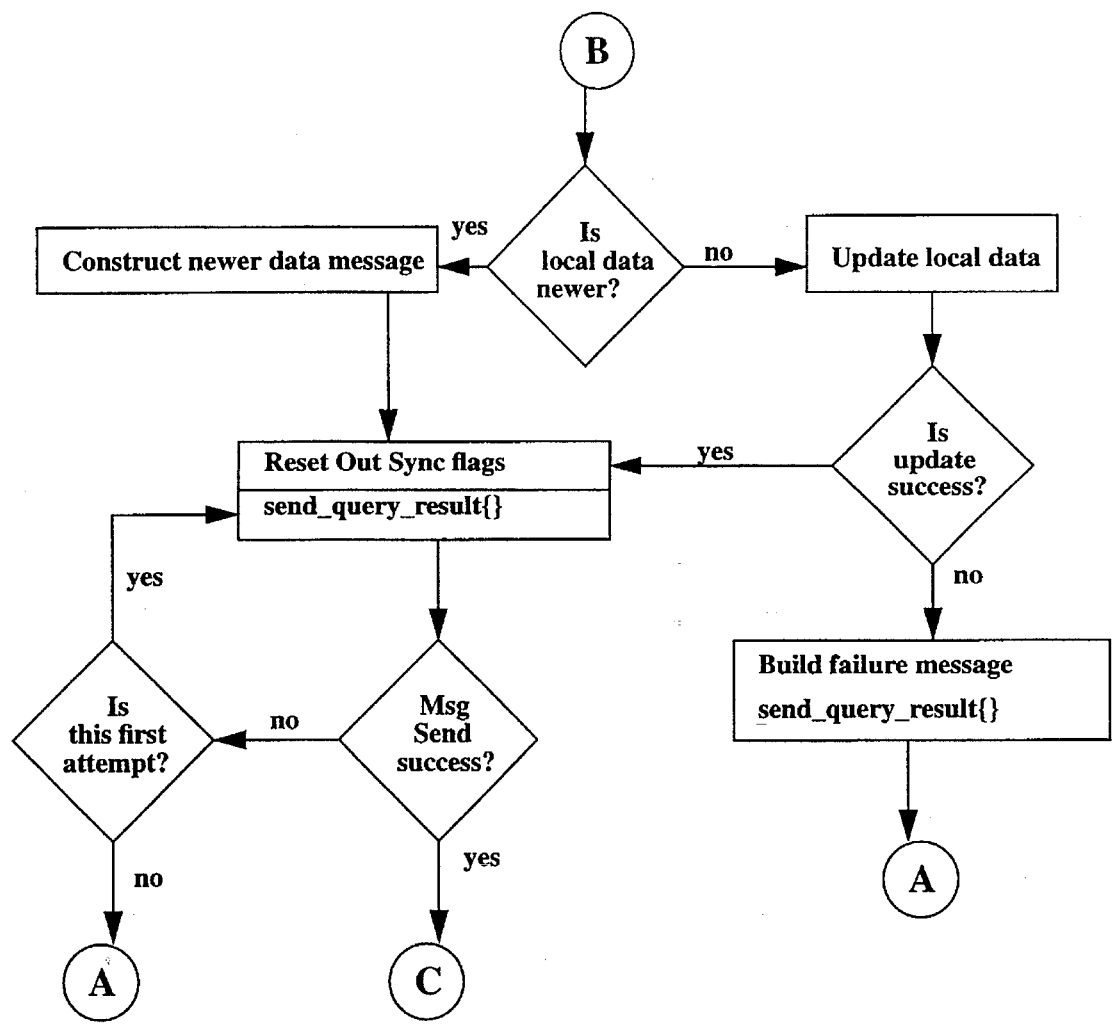

FIG. 15 shows logic design flow for updating a Target Service Control Point from a Source. The Target receives a Sync Update Message. If the relevant local data is newer than that contained in the message, then a NewerData Result Message is built, the local data is included in the Result Message, and that message is returned to the Source. If the local data is older, then it is updated and time stamped; a Success Result Message is built and sent to the Source as well. If the effort to update the Target data fails, the Result Message is set to "failure" and that message is returned to the Source Service Control Point, a Resync Process is scheduled at the Source (as shown in FIGS. 11 and 12) and the process ended (as shown in FIG. 11). If a second attempt to send a Success Result Message is unsuccessful, the process is ended or a Resync Process is scheduled (as shown in FIG. 11).

If the received Message was an Area Transfer (Transfer Update Message), the relevant table is searched to obtain the destination SCP CLLI code and a Result Message is built and sent (FIG. 12). If a Sync Update Message cannot be delivered to the mated, destination Service Control Point, then the communication is reattempted and the data marked out-of-sync if the second attempt is unsuccessful. A Resync Process is then rescheduled (FIG. 12).

According to the preferred embodiment, a time stamp for updated subscriber changeable data is preferably marked in the originating entity or Control Network Element in order to eliminate time synchronization problems between Service Control Points and in order to ensure consistency for future Resync Processes. Although the logic design mentioned above generally reattempts message transmission only once, the logic may be changed as statistics are maintained on performance of the system in order to ensure maximum efficiency and success rate. In addition, other parameters such as time between Resync Processes may be varied and optimized as desired.

The foregoing is provided for purposes of explanation and disclosure of a preferred embodiment of the present invention. Upgrades, changes, revisions, new versions, and/or migrations to new platforms, software, architecture, protocols or standards may be implemented without departing from the scope or spirit of the present invention.

What is claimed is:

1. A process for maintaining data concurrence in a plurality of databases in a telecommunications network, including the steps of:
   a. providing to a Control Network Element information regarding data in at least one of the databases which is desired to be changed;
   b. communicating to a Source Network Element that contains at least one of the databases, via the Control Network Element, a first message that contains (i) information about the data that is desired to be changed; and (ii) a time stamp;
   c. changing information in the database in the Source Network Element based on information in the message received by the Source Network Element;
   d. communication to a Target Network Element that contains at least one of the databases, via the Source Network Element, a second message that contains (i) information about the data that is desired to be changed; and (ii) the time stamp; and
   e. changing information in the database in the Target Network Element based on information in the message received by the Target Network Element.

2. The process according to claim 1 comprising the further step of communicating a result message to the Control Network Element via the Source Network Element regarding level of success in accomplishing data changes in at least the Source Network Element.

3. The process according to claim 1 comprising the further step of communicating a result message to the Source Network Element via the Target Network Element regarding level of success in accomplishing data changes in at least the Target Network Element.

4. The process according to claim 1 in which the step of communicating the first message to the Source Network Element that contains at least one of the databases, via the Control Network Element, includes the steps of attempting to send the first message to a first Network Element in a pair of network elements a predetermined number of times, upon failure of which attempts the first message is sent to the other Network Element in the pair (which Network Element is considered the Source Network Element).

5. The process according to claim 4 in which the step of communicating the message to the other Network Element further comprises the steps of attempting to send the message to that Network Element a predetermined number of times, upon failure of which attempts the Control Network Element discontinues the process of attempting to communicate to the Source and the Target Network Elements information about the data that is desired to be changed.

6. The process according to claim 1 in which the Control Network Element is a Service Node and the Source Network Element and the Target Network Element are Service Control Points.

7. The process according to claim 1 in which communication occurs using non-overlay communication links.

8. The process according to claim 1 in which communication occurs using Signalling System Seven architecture.

9. The process according to claim 1 in which the time stamps form the only basis for comparing currency of subscriber data between the Source and Target Network Elements.

10. The process for maintaining data concurrence in a plurality of databases, each of which is contained, at least in part, in its corresponding telecommunications Network Element, comprising the steps of:
   a. providing to a Control Network Element information relating to changes that are desired in data stored in the databases and corresponding to a particular subscriber;
   b. communicating to a Source Network Element that contains at least one of the databases, via the Control Network Element, a first message that contains (i) information about the data that is desired to be changed; and (ii) a time stamp;
   c. attempting to change information in the database in the Source Network Element based on information in the first message received by the Source Network Element;
   d. communicating to the Control Network Element via the Source Network Element a second, result message regarding level of success in changing the data in the Source Network Element;
   e. communicating to a Target Network Element that contains at least one of the databases, via the Source Network Element, a third message that contains (i) information about the data that is desired to be changed; and (ii) the time stamp;
   f. attempting to change information in the database in the Target Network Element based on information in the third message, received by the Target Network Element; and
   g. communicating to the Source Network Element via the Target Network Element a fourth, result message regarding level of success in changing the data in the Target Network Element.

11. The process according to claim 10 in which the step of communicating the first message to a Source Network Element that contains at least one of the databases, via the Control Network Element, includes the steps of attempting to send the message to a first Network Element in a pair of network elements a predetermined number of times, upon failure of which attempts the message is communicated to the other Network Element in the pair (which Network Element is considered the Source Network Element).

12. The process according to claim 11 in which the step of communicating the message to the other Network Element further comprises the steps of attempting to send the message to that Network Element a predetermined number of times, upon failure of which attempts the Control Network Element discontinues the process of attempting to communicate to the Source and the Target Network Elements information about the data that is desired to be changed.

13. The process according to claim 10 further comprising the steps of setting out-of-sync flags corresponding to data changes which have not been updated.

14. The process according to claim 10 in which, if either of the result messages is not received indicating a successful data change, the process is discontinued.

15. The process according to claim 10 in which the Control Network Element is a Service Node and the Source Network Element and the Target Network Element are Service Control Points.

16. The process according to claim 10 in which communication occurs using non-overlay communications links.

17. The process according to claim 10 in which communication occurs using Signalling System Seven architecture.

18. The process according to claim 10 in which the time stamps form the only basis for comparing currency of subscriber data between the Source and Target Network Elements.

19. The process for maintaining data concurrence in a pair of databases, each contained in a corresponding telecommunications Network Element, including the step of:

a. providing to a Control Network Element information corresponding to a subscriber that is desired to be changed;

b. attempting to communicate to a first Network Element in the pair, via the Control Network Element, and for a predetermined number of attempts, a first message that contains information about the data that is desired to be changed and a time stamp;

c. if the attempts stated in step (b) are successful, and relevant data is located, changing data in the first Network Element, sending a second, success result message to the Control Network Element, and attempting to communicate to the second Network Element in the pair for a predetermined number of attempts a third message that contains information about the data that is desired to be changed and the time stamp;

d. if the attempts stated in step (c) are successful, interpretation of the third message is successful, and relevant data is located, changing data in the second Network Element and sending a fourth, success result message to the first Network Element;

e. if the attempts stated in step (b) fail, attempting to communicate to the second Network Element in the pair, via the Control Network Element, and for a predetermined number of attempts, a second message that contains information about the data that is desired to be changed and the time stamp; and doing the following:

1. if the attempts stated in step (e) (excluding these subparts (1)–(3)) are successful, interpretation of the second message is successful, and relevant data is located, changing data in the second Network Element, sending a fourth, success result message to the Control Network Element, and attempting to communicate to the first Network Element in the pair for a predetermined number of attempts a fifth message that contains information about the data that is desired to be changed and the time stamp;

2. if the attempts stated in step (1) are successful, interpretation of the fifth message is successful, and relevant data is located, changing data in the first Network Element and sending a sixth, success result message to the second Network Element; and 3. if the efforts stated in steps (1) or (2) fail, sending a seventh, failure message and discontinuing the data concurrence process at least temporarily; and f. if the attempts stated in step (e) to communicate to the Second Network Element fail, discontinuing the data concurrence process at least temporarily.

20. The process according to claim 19 in which the steps of sending a success result message comprise the steps of attempting to send the success result message a predetermined number of attempts and if the attempts are unsuccessful, discontinuing the data concurrence process at least temporarily.

21. The process according to claim 19 in which, if data is not changed successfully, an out of sync flag is set in the relevant database.

22. The process according to claim 21 further comprising the step of resynchronizing, between the databases, and at a subsequent time, all data marked with out of sync flags.

23. The process for synchronizing data in a pair of databases, each contained in a corresponding telecommunications Network Element and each containing data relating to a plurality of subscribers, the currency status of at least some of the data for each subscriber being denoted by at least one flag, including the steps of:

a. at a predetermined time, reviewing the data in the database of a first of the Network Elements for presence of out-of-synchronization flags and if at least one is found, determining whether the second of the Network Elements is out of synchronization;

b. if out-of-synchronization flags exist in the first Network Element and the second Network Element is determined to be out of synchronization, sending a resync message to the second Network Element via the first Network Element a predetermined number of times, which resync message contains information relating to at least one subscriber and a time stamp;

c. changing data in the second Network Element based on the information contained in the resync message and resetting flags corresponding to such changed data;

d. again, conducting step (a) and, if necessary, steps (b) through (d) until no data is found to be out of synchronization and then discontinuing the process.

24. The process according to claim 23 in which, if no out-of synchronization flags are found or the second of the Network Elements is not out-of-synchronization in step (a), the process is discontinued for a predetermined time.

25. The process according to claim 24 in which includes, if the resync message fails to reach the second Network Element, the step of discontinuing the process for a predetermined time.

26. The process according to claim 23 which is initiated and terminated automatically.

27. The process according to claim 23 which is initiated via manual intervention.

28. The process for maintaining data concurrence in a plurality of databases in a telecommunications network, including the steps of:

a. communicating to a Source Network Element that contains at least one of the databases, a first request message that contains information about the data that is desired to be changed;

b. changing information in the database in the Source Network Element based on information in the first request message received by the Source Network Element;

c. communicating to a Target Network Element, that contains at least one of the databases, using platform based logic in the Source Network Element, a second request message that contains information about the data that is desired to be changed; and d. changing information in the database in the Target Network Element based on information in the second request message received by the Target Network Element.

29. The process according to claim 28 in which the request messages are different from each other.

30. The process according to claim 28 in which the request messages are the same as each other.

31. The process according to claim 28 comprising the further steps of communicating a result message to the Network Element from which a corresponding request message was received regarding level of success in accomplishing data changes in the Network Element that received the request message.

32. The process according to claim 31 in which result messages are also sent to other Network Elements in addition to the one which sent the request message.

33. The process according to claim 28 in which at least one request message contains timing information that is used by at least one Network Element to determine currency of its data.

34. The process according to claim 33 in which all request messages contain the timing information from the same source, and that timing information is the sole timing information that is employed to determine currency of at least some of the data stored in the Network Elements.

35. The process according to claim 28 in which the Source Network Element may be any Network Element that contains relevant data, and if a request message fails to be communicated to a designated Source Network Element, an attempt is made to send a request message to another Network Element which then becomes the Source Network Element.

36. The process for maintaining data concurrence in a plurality of databases in a telecommunications network, including the steps of:
   a. providing to a Control Network Element information regarding data in at least one of the databases which is desired to be changed;
   b. communicating to a Source Network Element that contains at least one of the databases, via the control Network Element, a first message that contains (i) information about the data that is desired to be changed; and (ii) a first time stamp;
   c. changing information in the database in the Source Network Element based on information in the first message received by the Source Network Element;
   d. communicating to a First Target Network Element that contains at least one of the databases, via the Source Network Element, a second message that contains (i) information about the data that is desired to be changed; and (ii) the time stamp;
   e. changing information in the database in the First Target Network Element based on information in the second message received by the First Target Network Element;
   f. communicating to a Second Target Network Element that contains at least one of the databases, via the Source Network Element, a third message that contains (i) information about the data that is desired to be changed; and (ii) the time stamp;
   g. changing information in the database in the Second Target Network Element based on information in the third message received by the Second Target Network Element;
   h. communicating to a Third Target Network Element that contains at least one of the databases, via the Second Target Network Element, a fourth message that contains (i) information about the data that is desired to be changed; and (ii) the time stamp; and
   i. changing information in the database in the Third Target Network Element based on information in the fourth message received by the Third Target Network Element.

37. The process according to claim 36 comprising the further steps of communicating a result message to the Network Element from which a corresponding request message was received regarding level of success in accomplishing data changes in the Network Element that received the request message.

38. The process according to claim 36 in which the step of communicating a message to Network Element that contains at least one of the databases includes the steps of attempting to send the message to the Network Element a predetermined number of times, upon failure of which attempts the message is communicated to another Network Element.

39. The process according to claim 38 in which the step of communicating the second message to the First Target Network Element further comprises the steps of attempting to send the message to that Network Element a predetermined number of times, upon failure of which attempts the Control Network Element discontinues the process of attempting to communicate to the Source and the First Target Network Elements information about the data that is desired to be changed.

40. The process according to claim 36 in which the Control Network Element is a Service Node and the Source and Target Network Elements are Service Control Points.

41. The process according to claim 36 in which communication occurs using non-overlay communications links.

42. The process according to claim 36 in which communication occurs using Signalling System Seven architecture.

43. The process according to claim 36 in which the Source and First Target Network Elements constitute a mated pair of Service Control Points that contain redundant databases of subscriber information, and the Second and Third Target Network Elements constitute a second mated pair of Service Control Points to which the subscriber information is being transferred during an area transfer operation.

44. Apparatus for maintaining data concurrence in a plurality of databases, each contained in a corresponding Network Element in a telecommunications network, comprising:
   a. a Control Network Element adapted to receive information regarding data in at least one of the databases which is desired to be changed;
   b. means for causing an original update request message to be prepared that contains information about the data that is desired to be changed and for communicating the original update request message to a Source Network Element;
   c. means in the Source Network Element for changing information in the database in the Source Network Element based on information in the original update request message received by the Source Network Element;
   d. platform based means in the Source Network Element for causing a synchronization update request message to be prepared that contains information about the data that is desired to be changed;
   e. platform based means for communicating the synchronization update message to a Target Network Element that contains at least one of the databases; and
   f. means in the Target Network Element for changing information in the database in the Target Network Element based on information in the synchronization update request message received by the Target Network Element.

45. Apparatus according to claim 44 further comprising platform based means in each Network Element for causing a result message to be sent to the Network Element from which a corresponding request message was received, regarding level of success in accomplishing data changes requested in the request message.

46. Apparatus according to claim 44 in which the means for preparing request messages also contains means for including a time stamp in the request messages.

47. Apparatus according to claim 46 in which the time stamp is originated in the Control Network Element.

48. Apparatus according to claim 47 in which the time stamp is the only means for determining currency of at least some of the data contained in the Source and Target Network Elements.

49. Apparatus according to claim 44 in which the Control Network Element is a Service Node and the Source Network Element and the Target Network Element are Service Control Points.

50. Apparatus according to claim 44 in which the communication means comprises non-overlay communications links.

51. Apparatus according to claim 44 in the communication means conforms to Signalling System Seven architecture.

* * * * *